United States Patent
Sandu et al.

(10) Patent No.: US 11,348,470 B1
(45) Date of Patent: May 31, 2022

(54) APPARENT VIDEO BRIGHTNESS CONTROL AND METRIC

(71) Applicant: Rockwell Collins, Inc., Cedar Rapids, IA (US)

(72) Inventors: Irina R. Sandu, Lake Oswego, OR (US); Zoubair Entezari, Woodburn, OR (US); Alexander D. Reid, Tualatin, OR (US); Usama Gheblawi, Tigard, OR (US); Daniel Y. Chiew, Dalton Gardens, ID (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/143,794

(22) Filed: Jan. 7, 2021

(51) Int. Cl.
*G09G 5/10* (2006.01)
*G08G 5/00* (2006.01)
*G09G 3/34* (2006.01)
*H04N 13/10* (2018.01)

(52) U.S. Cl.
CPC ......... *G08G 5/0021* (2013.01); *G08G 5/0047* (2013.01); *G09G 3/3406* (2013.01); *G09G 5/10* (2013.01); *G09G 2320/066* (2013.01); *G09G 2320/0666* (2013.01); *H04N 13/10* (2018.05)

(58) Field of Classification Search
CPC .. G08G 5/0021; G08G 5/0047; G09G 3/3406; G09G 5/10; G09G 2320/066; G09G 2320/0666; H04N 13/10; H04N 13/106; H04N 13/133
See application file for complete search history.

(56) References Cited

U.S. PATENT DOCUMENTS

| | | | |
|---|---|---|---|
| 5,870,154 A | 2/1999 | Conover et al. | |
| 5,909,244 A * | 6/1999 | Waxman | H04N 5/335 348/E5.073 |
| 8,099,234 B1 * | 1/2012 | Frank | G01C 23/005 701/436 |
| 8,593,480 B1 | 11/2013 | Ballestad et al. | |
| 9,418,408 B1 | 8/2016 | Thompson | |
| 10,242,627 B2 * | 3/2019 | Farrell | G09G 3/34 |
| 10,455,199 B1 * | 10/2019 | Clemen, Jr | G06T 7/97 |
| 10,692,465 B2 | 6/2020 | Atkins | |
| 2001/0019361 A1 | 9/2001 | Savoye | |
| 2013/0120468 A1 | 5/2013 | Hsieh et al. | |

(Continued)

FOREIGN PATENT DOCUMENTS

| WO | 2018119161 A1 | 6/2018 |
|---|---|---|
| WO | 2020060980 A1 | 3/2020 |

*Primary Examiner* — Antonio Xavier
(74) *Attorney, Agent, or Firm* — Suiter Swantz pc llo (57) ABSTRACT

An aircraft display control system is disclosed. The system comprises one or more displays configured to present a video stream of a surrounding environment to a user of the aircraft, image sensors configured to generate images of the surrounding environment, and a controller configured to execute an enhanced vision system (EVS) module, a synthetic vision system (SVS) module, a combined vision system (CVS) module and a brightness equalization module. The brightness equalization module measures an apparent brightness of a first frame of the video stream and applies a sigmoid transform function to equalize grayscale levels of a second frame of the video stream based on the apparent brightness of the first frame.

13 Claims, 7 Drawing Sheets

(56) References Cited

U.S. PATENT DOCUMENTS

| | | | |
|---|---|---|---|
| 2014/0341467 A1* | 11/2014 | Seo | G06T 5/50 |
| | | | 382/167 |
| 2017/0293796 A1* | 10/2017 | Li | G06T 5/40 |
| 2019/0304379 A1* | 10/2019 | Pytlarz | G09G 3/3406 |
| 2020/0027385 A1 | 1/2020 | Capps | |
| 2020/0351451 A1* | 11/2020 | Tillotson | G06T 3/00 |
| 2020/0351524 A1* | 11/2020 | Lee | H04N 19/33 |
| 2021/0174763 A1* | 6/2021 | Ohtsuka | H04N 1/407 |
| 2021/0185271 A1* | 6/2021 | Kalliomaki | G06T 5/40 |
| 2021/0312883 A1* | 10/2021 | Yoo | G09G 3/2011 |

\* cited by examiner

APPARENT VIDEO BRIGHTNESS CONTROL AND METRIC

SUMMARY

An aircraft display control system is disclosed in accordance with one or more illustrative embodiments of the present disclosure. In one illustrative embodiment, the system comprises one or more displays configured to present a surrounding environment to a user of the aircraft. In another illustrative embodiment, the system comprises one or more image sensors configured to generate images of the surrounding environment. In another illustrative embodiment, the system comprises a controller communicatively coupled to the image sensor(s) and the display(s). The controller includes one or more processors configured to execute program instructions. An enhanced vision system (EVS) module causes the one or more processors to: receive the images of the surrounding environment, generate enhanced images of the surrounding environment by overlaying flight data on the enhanced images, and display an enhanced video stream including the enhanced images on the display(s) to the user of the aircraft. A synthetic vision system (SVS) module causes the one or more processors to: generate synthetic images of the surrounding environment, and display a synthetic video stream including the synthetic images on the display(s) to the user of the aircraft. A combined vision system (CVS) module causes the one or more processors to: generate combined images of the surrounding environment by overlaying the enhanced video stream and the synthetic video stream, and display a combined video stream including the combined images on the display(s) to the user of the aircraft. A brightness equalization module causes the one or more processors to: measure an apparent brightness of a first video stream displayed on the display(s) during a first period of time, wherein the first video stream is the enhanced video stream, the synthetic video stream, or the combined video stream, and the apparent brightness is defined by (i) an average of grayscale levels of frames of the first video stream and (ii) a standard deviation of the grayscale levels of the frames of the first video stream, apply a sigmoid transform function to equalize grayscale levels of frames of a second video stream based on the apparent brightness of the first video stream responsive to the user changing the first video stream to the second video stream displayed on the display(s) during a second period of time subsequent to the first period of time, wherein the second video stream is another of the enhanced video stream, the synthetic video stream, or the combined video stream, and display the second video stream on the display(s) to the user of the aircraft.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Aircraft computer vision systems display a scene of the environment around the aircraft to a pilot of the aircraft. Aircraft computer vision systems have applications in civilian and military training and operations, transportation, simulation, gaming, manufacturing, among other applications. Aircraft computer vision systems may include enhanced flight vision system (EFVSs), enhanced vision systems (EVSs), synthetic vision systems (SVSs), combined vision systems (CVSs) and/or augmented reality (AR) systems.

EVSs generate and present a video stream (e.g. image stream) of images captured by image sensors (e.g., electo-optical sensors) and typically include overlaid symbols and data (e.g., classifiers for the identification of objects, terrain, speed and altitude data, etc.). SVSs generate and present a video stream of synthetically generated images using terrain, obstacle, hydrological and other databases. An SVS can assist a pilot when navigating in low-visibility conditions (e.g., instrument flight rules [IFR]) in combination with global position system (GPS) and inertial reference systems. CVSs generate and present a video stream that combines (e.g., overlays) both the EVS and the SVS at the center of the screen.

A problem arises when pilots view a video stream on a heads-up-display (HUD) during the takeoff and landing phases of the flight. Aviation authorities, for example, the Federal Aviation Authority (FAA), place limitations on the ability to modify the HUD during certain phases of flight. For example, the pilot can change the video source viewable on the HUD from an EVS stream to an SVS stream, or from an EVS stream to a CVS stream, etc. However, when at a height below 180 feet above-ground-level (AGL), the pilot is prohibited from changing the video source for some HUD systems. Additionally, at a height below 800 feet AGL, the pilot is prohibited from changing the brightness of a video stream for some HUD systems. This brightness limitation can present a safety risk since the brightness of each frame may differ which may be distracting and may cause difficulty in identifying a runway, obstacles, etc. Therefore, it is desirable to improve an aircraft computer vision system to advantageously present video streams of sufficient clarity for safe and efficient navigation.

Embodiments of the present disclosure are directed to a computer vision system for an aircraft including a controller, one or more image sensors, and one or more displays. A brightness equalization module may measure an apparent brightness of a first frame of a video stream (e.g., an enhanced video stream, a synthetic video stream, or a combined video stream) by measuring (i) an average of grayscale levels of pixels of the first frame and (ii) a standard deviation of the grayscale levels of the pixels of the first frame. A sigmoid transform function may be applied in real-time to equalize grayscale levels of pixels of a second frame of the video stream based on the apparent brightness measured from the first frame. The second frame may then be displayed, for example, on a HUD to a pilot of the aircraft at the equalized grayscale levels.

Figure 1:
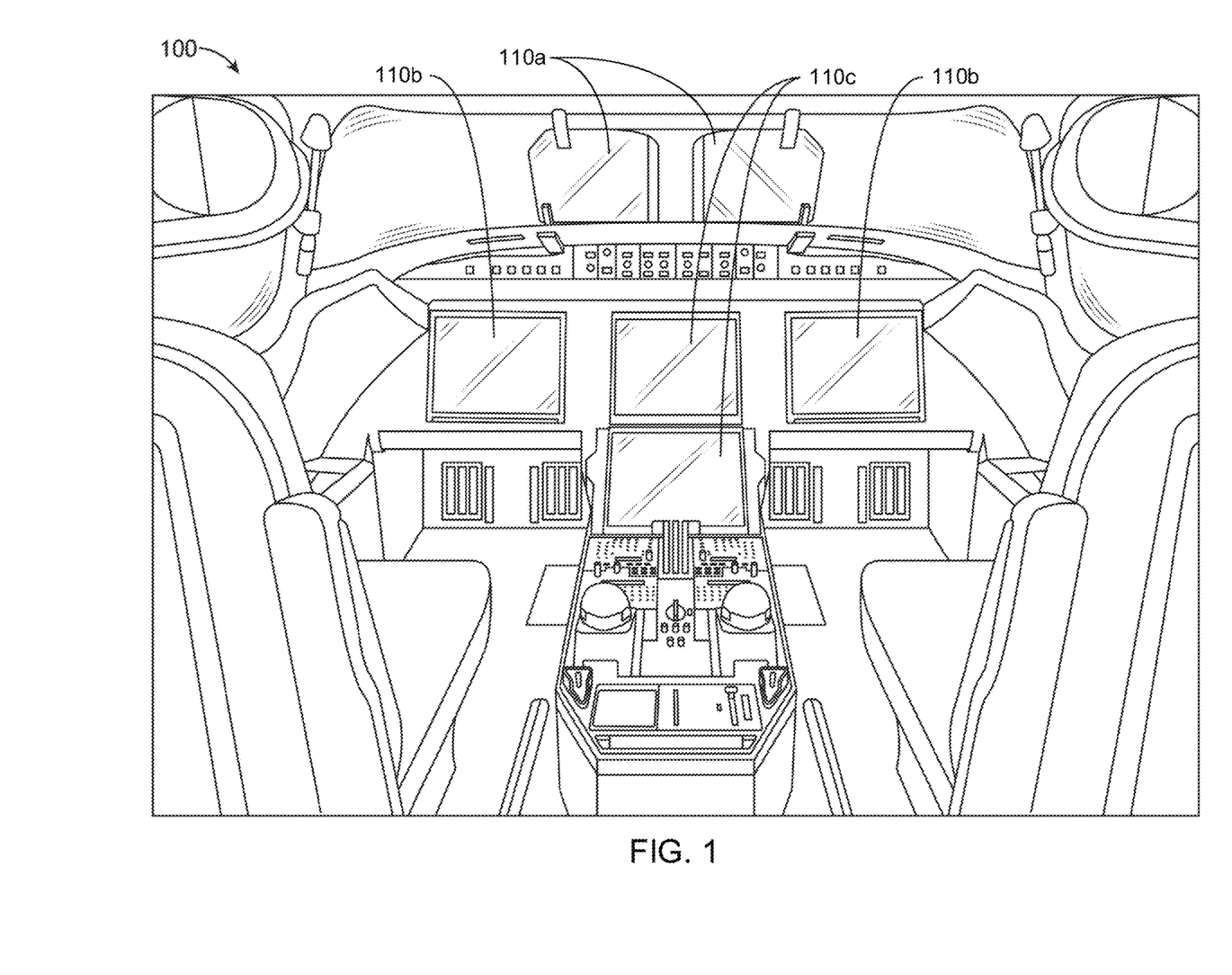
FIG. 1 is a drawing illustrating an aircraft environment, in accordance with one or more embodiments of the present disclosure.

FIG. 1 is a drawing illustrating an aircraft environment 100 including one or more displays 110a-c, in accordance with one or more embodiments of the present disclosure. The aircraft environment 100 may be, for example, the cockpit of an aircraft (e.g., airplane, helicopter, etc.). The displays 110a may be HUDs that present flight data (e.g., the video streams of the EVS, SVS, and CVS, including images of runways and/or obstacles) to the user(s) of the aircraft. The HUDs 110a may be substantially transparent or partially transparent to allow ambient light that passes through the windshield from the surrounding environment to reach the users. In this way, the users see both the video stream and the actual environment, and the video stream of the EVS/SVS/CVS may guide the user in limited-visibility environments (e.g., when instrument flight rules are in effect). The displays 110b may be primary flight displays (PFDs), also known as flight displays (FDs) or adaptive flight displays (AFDs), configured to display flight data (e.g., flight speed, altitude, horizon orientation, air pressure, navigational data, etc.). The displays 110c may be multi-function displays (MFDs) surrounded by multiple soft keys (configurable buttons) configured to display information to the user in numerous configurable ways. The displays 110a-c may include cathode-ray tubes (CRTs), liquid-crystal displays (LCDs), light-emitting diodes (LEDs), organic light-emitting diodes (OLEDs), transparent or partially transparent OLEDs, etc. Additionally, the displays may be communicatively coupled to customized hardware including one or more application-specific integrated circuits (ASICs) and/or field-programmable gate arrays (FPGAs).

Figure 2:
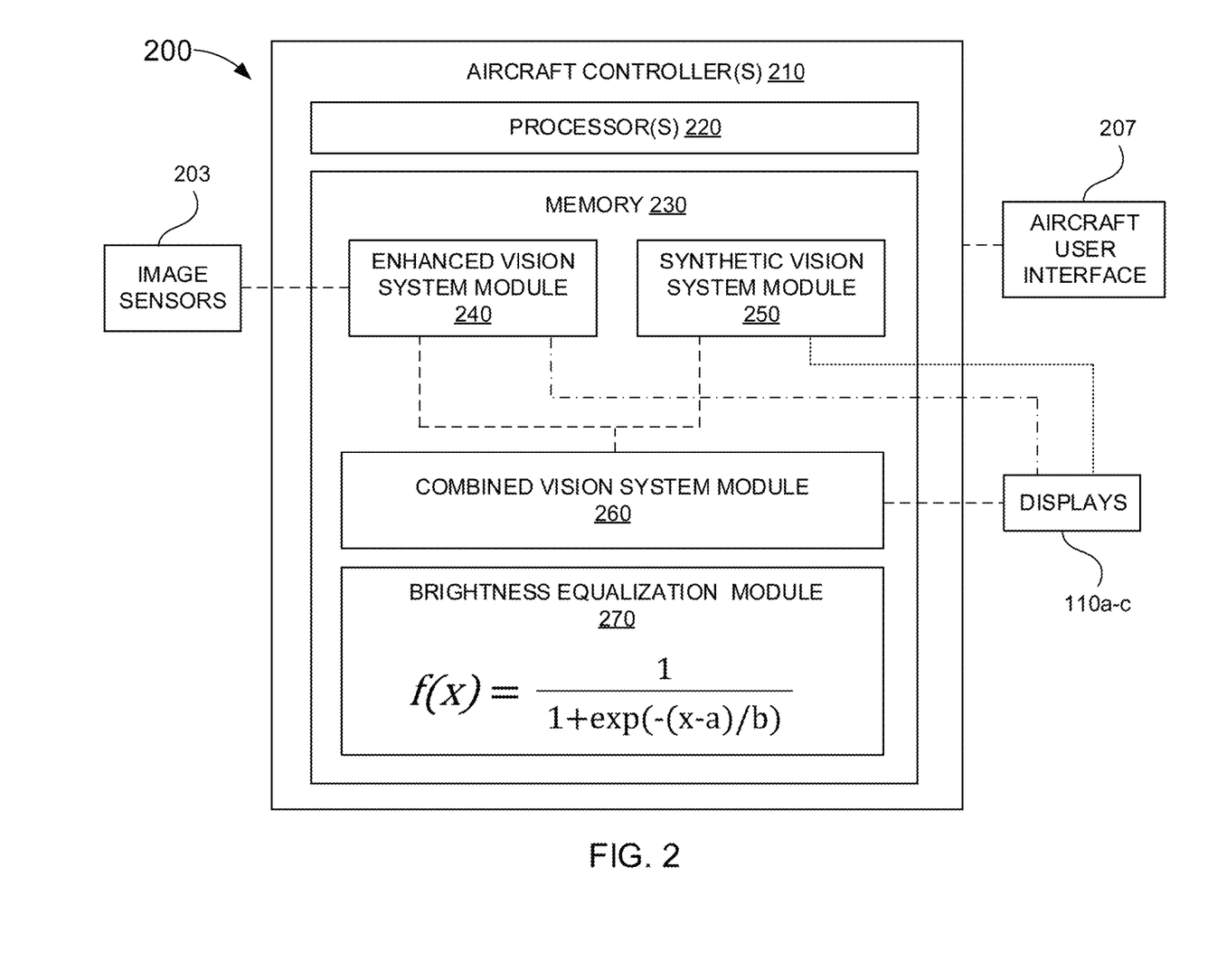
FIG. 2 is a diagram view illustrating an aircraft display control system, in accordance with one or more embodiments of the present disclosure.

FIG. 2 is a diagram illustrating an aircraft display control system 200, in accordance with one or more embodiments of the present disclosure. The system 200 may comprise one or more aircraft controllers 210 communicatively coupled to the display(s) 110a-c, one or more image sensors 203, and an aircraft user interface 207.

The controller(s) 210 (i.e., computers or computing systems) may one or more processor(s) 220 and a memory 230. The one or more processors 220 may include one or more central processing unit (CPUs), graphics processing units (GPUs), ASICs, FPGAs, and/or other processors or hardware accelerators. The memory 230 may include nonvolatile memory (e.g., hard disk drive [HDD], solid state disk [SSD], flash memory, ROM, etc.) and volatile memory (RAM, SDRAM, etc.). In some embodiments, at least one of the controller(s) 210 may be located remotely (e.g., as part of a cloud-computing system) and may receive data transmitted over a network.

The one or more processors 220 may be configured to execute program instructions (e.g., modules, software, programs, scripts, libraries, extensions etc.) stored on the memory 230 that cause the one or more processors 220 perform various functions, procedures, algorithms, etc. described in the present disclosure. For example, the program instructions may include an enhanced vision module 240 (e.g., an EVS), a synthetic vision module 250 (e.g., an SVS), a combined vision module 260 (e.g., a CVS), and/or a brightness equalization module.

The memory 230 may include any storage medium known in the art suitable for storing program instructions executable by the associated one or more processors 220 and data received from the sensors 203 and the user interface 207. For example, the memory 230 may include a non-transitory memory medium. It is noted that the memory 230 may be housed in a common housing with the one or more processors 220. Alternatively, the memory 230 may be located remotely with respect to the physical location of the processors 220 and the controller(s) 210.

The one or more sensors 203 may comprise electro-optical (EOIR) sensors (e.g., visible light sensors, infrared sensors, hyperspectral sensors, RGB cameras, etc.) and may be configured to capture images of a surrounding environment of the aircraft. The aircraft user interface 207 may include instruments configured to control the aircraft or inform the user of flight data. The instruments may include, for example, joysticks, buttons, knobs, switches, levers, indicators, gauges, etc. In some embodiments, the aircraft user interface 207 may further include a mouse, keyboard, headset, headpiece, microphone, speakers, etc.

The EVS module 240 may cause the one or more processors 220 to receive the images of the surrounding environment from the sensor(s) 203 and generate enhanced images of the surrounding environment by adding flight data to the enhanced images. The flight data may include, for example, terrain awareness data, horizon orientation data, speed data, altitude data, vertical speed data, compass data, etc. that may assist and guide a pilot during the takeoff and landing phases of a flight. The EVS module 240 may then cause the one or more processors 220 to display an enhanced video stream including the enhanced images on the display(s) 110a-c to the user of the aircraft.

The SVS module 250 may cause the one or more processors 220 to generate synthetic images of the surrounding environment. The synthetic images may be generated using terrain, obstacle, hydrological and other databases. The SVS may assist or guide a pilot when navigating in low-visibility conditions (e.g., instrument flight rules [IFR]) with the EVS, global position system (GPS) and/or inertial reference systems. The SVS module 250 may then cause the one or more processors 220 display a synthetic video stream including the synthetic images on the display(s) 110a-c to the user of the aircraft.

The combined vision system (CVS) module 260 causes the one or more processors 220 to generate combined images of the surrounding environment by overlaying the enhanced video stream and the synthetic video stream. For example, the synthetic video stream may be overlaid over the enhanced video stream to complement the enhanced video stream (e.g., provide additional information, for example, of a runway or obstacles). The combined vision system (CVS) module 260 may then cause the one or more processors 220 to display a combined video stream including the combined images on the display(s) 110a-c to the user of the aircraft.

The brightness equalization module 270 causes the one or more processors 220 to measure an apparent brightness of a first frame of a video stream. The video stream may be, for example, the enhanced video stream, the synthetic video stream, or the combined video stream. The apparent brightness may be defined by (i) an average of grayscale levels of pixels of a first frame of the video stream and (ii) a standard deviation of the grayscale levels of the pixels of the first frame of the video stream. A sigmoid transform function may be applied to equalize grayscale levels of a second frame of the video stream based on the apparent brightness measured from the first frame. The second frame may then be displayed on the display(s) 110a-c to the user of the aircraft at the equalized grayscale levels. It is noted herein that the terms "first frame" and "second frame" are used for illustrative purposes, and that the term "second frame" may be construed as any frame of the video stream generated subsequent to the "first frame" of the video stream. In some embodiments, the "first frame" and the "second frame" may be the same frame of the video stream (e.g., a single frame), and the sigmoid transform function may be adjusted based on the apparent brightness of the single frame (e.g., instead of being based on the apparent brightness of the previous frame).

The sigmoid transform function (e.g., sigmoid-like transform function or S-curve function) may have a formula:

$$f(x) = \frac{1}{1 + \exp(-(x-a)/b)}$$

An apparent brightness level metric may be defined to quantify the apparent brightness: Apparent Brightness Metric=Frame Average Grayscale Level+Frame Contrast Measure, where the Frame Contrast Measure is based on the standard deviation of the grayscale levels of the pixels of the frame. The grayscale levels of the second frame (e.g., incoming video stream) may be remapped (e.g., equalized) by using the sigmoid transform function (e.g., S-curve function) in real-time and by using the incoming frame data. A center of the S-curve may be adjusted horizontally (e.g., to center the S curve at different grayscale values) and may vary based on the Average Grayscale Level of the first frame (and, optionally, with a user knob adjustment) and the slope may be adjusted based on the Frame Contrast Measure. In some embodiments, the position of the center of the S-curve may have a linear relationship to the apparent brightness and the knob adjustment level of the incoming frame (e.g., second frame). Each S-curve may be stored as a look-up-table (LUT) for fast and effective retrieval of the transform function for a range of apparent brightness values.

Figure 3A:
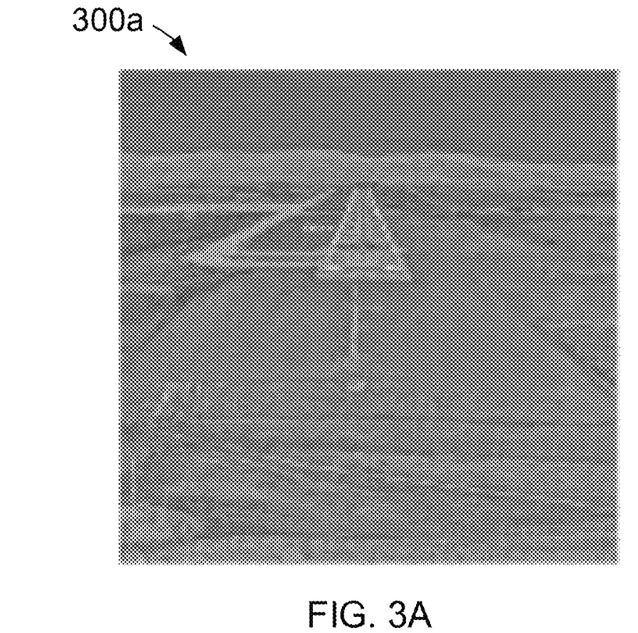
FIGS. 3A and 3B are images showing the results of a brightness transformation in an enhanced vision system (EVS) image, in accordance with one or more embodiments of the present disclosure.
Figure 3B:
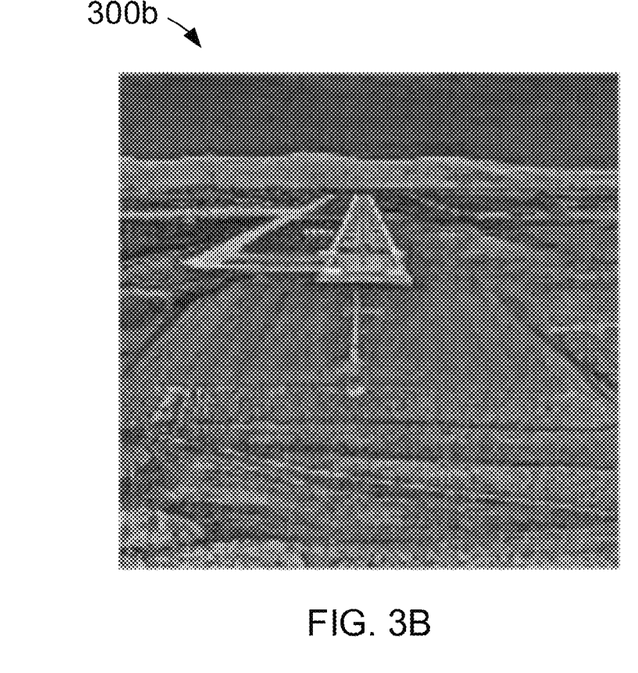
Figure 4A:
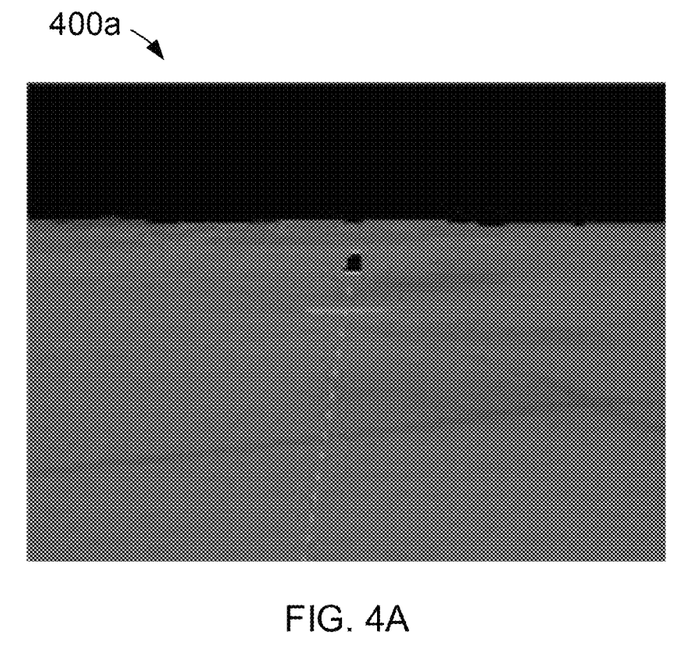
FIGS. 4A and 4B are images showing the results of a brightness transformation in a synthetic vision system (SVS) image, in accordance with one or more embodiments of the present disclosure.
Figure 4B:
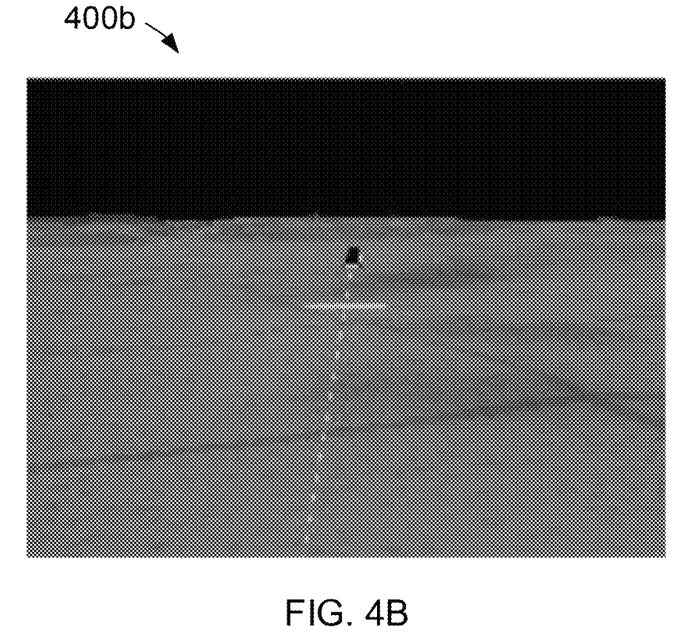

FIGS. 3A-3B are images showing the results of a brightness transformation applied to enhanced video stream image 300a using the brightness equalization module 270. As shown, the brightness transformation produces an enhanced video stream image 300b with an aircraft runway more clearly discernable in the image 300b in comparison to the image 300a. Similarly, FIGS. 4A-4B are images showing the results of a brightness transformation applied to synthetic video stream image 400a using the brightness equalization module 270. As shown, the brightness transformation produces an synthetic video stream image 400b with simulated terrain more clearly discernable in the image 400b in comparison to the image 400a.

Figure 5:
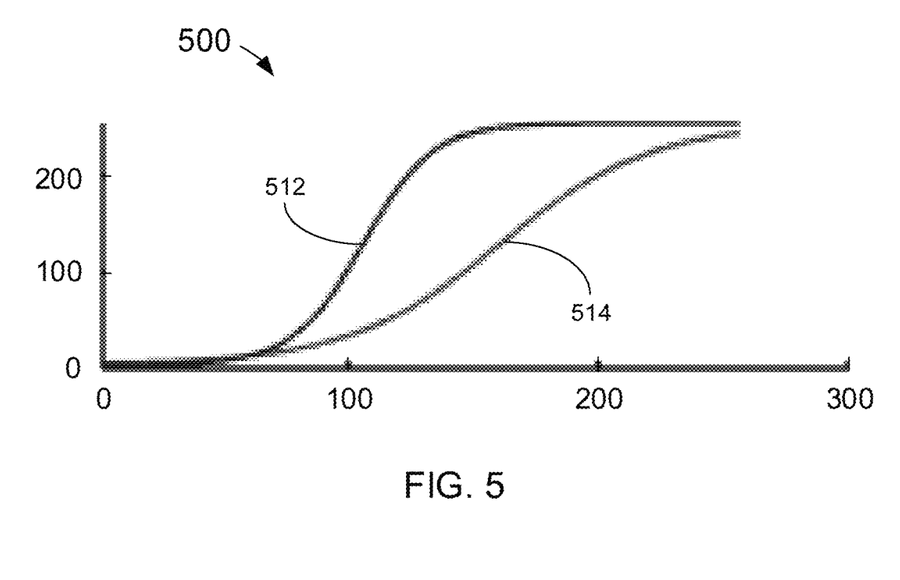
FIG. 5 is a graph showing sigmoid transform functions stored as look-up-tables, in accordance with one or more embodiments of the present disclosure.

FIG. 5 is a graph showing sigmoid transform functions 512 and 514 stored as look-up-tables, in accordance with one or more embodiments of the present disclosure. The vertical axis may denote number of pixels and the horizontal axis may denote grayscale level (e.g., from 0-255). The sigmoid transform function 514 may be used for an EVS transform and the sigmoid transform function 512 may be used for an SVS transform. A transform derived from the statistical properties of a darker input frame may produce a brighter output, and vice versa. The output frame may appear normalized from an apparent brightness perspective, as dark images are brightened and, conversely, bright images are darkened. The output frame may have its histogram stretched and normalized to produce an equalized look between the two frames. Additionally, a brightness knob may adjust the center of the sigmoid transform to produce a brighter or darker stream (e.g., for low knob levels the output frame may be darker, while for high knob levels the output frame may be brighter).

Figure 6A:
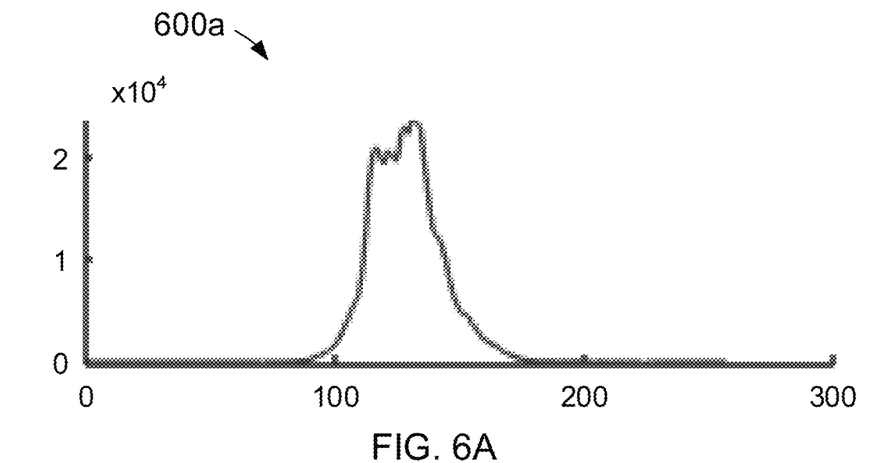
FIGS. 6A-6B are histograms showing the grayscale levels of pixels of an EVS frame before and after the application of a sigmoid transform, in accordance with one or more embodiments of the present disclosure.
Figure 6B:
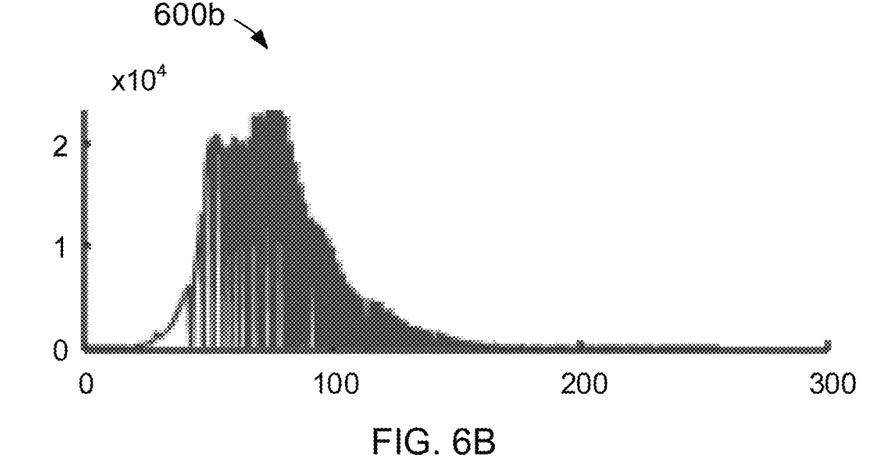

FIG. 6A is a histogram 600a showing the grayscale levels of pixels of an EVS frame before the application of the sigmoid transform function 514, in accordance with one or more embodiments of the present disclosure. FIG. 6B is a histogram 600b showing the grayscale levels of pixels of the EVS frame after the application of the sigmoid transform function 514, in accordance with one or more embodiments of the present disclosure. As shown, the histogram 600b produces a darker image than the original histogram of 600a.

Figure 7A:
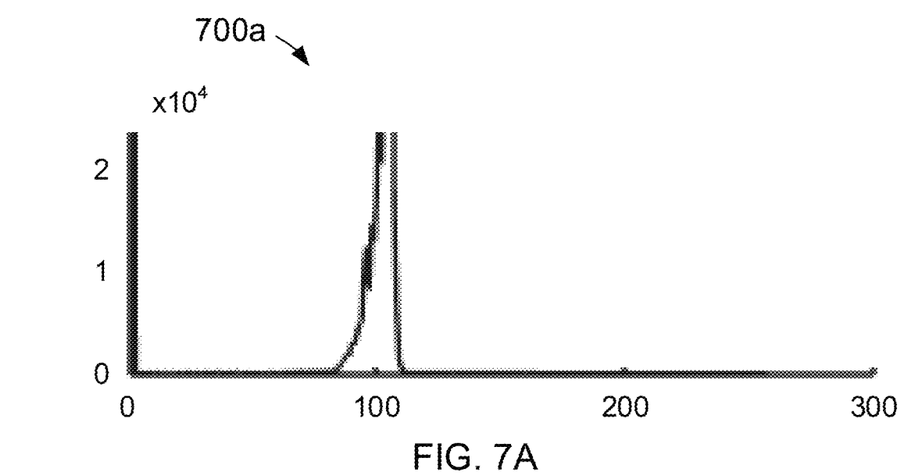
FIGS. 7A-7B are histograms showing the grayscale levels of pixels of an SVS frame before and after the application of a sigmoid transform, in accordance with one or more embodiments of the present disclosure.
Figure 7B:
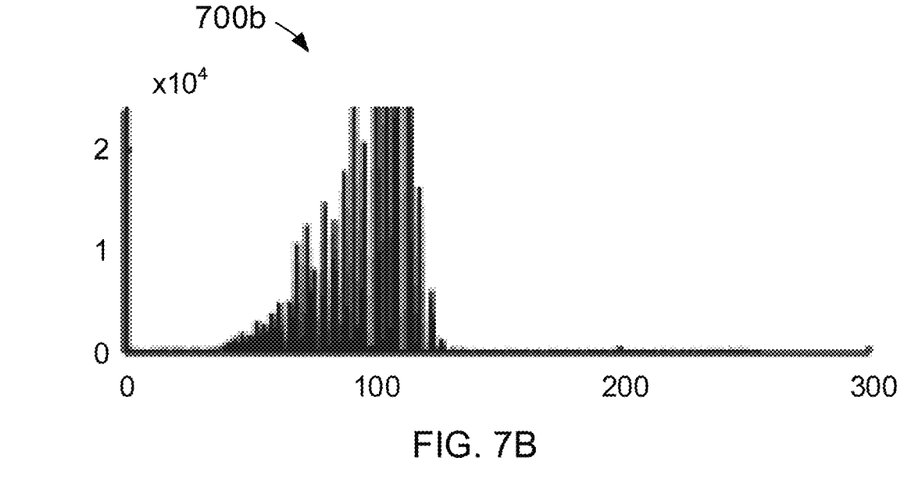

FIG. 7A is a histogram 700a showing the grayscale levels of pixels of an SVS frame before the application of the sigmoid transform function 512, in accordance with one or more embodiments of the present disclosure. FIG. 7B is a histogram 700b showing the grayscale levels of pixels of the SVS frame after the application of the sigmoid transform function 512, in accordance with one or more embodiments of the present disclosure. As shown, the histogram 700b produces a brighter image than the original histogram of 700a.

The present system 200 may bring frames having apparent brightness levels varying up to ±90%, within similar apparent brightness levels (e.g., varying less than ±20%) while maintaining or enhancing the original look and qualities of the original frame. In this way, the brightness equalization module 420 may provide consistent apparent brightness in the images presented on the HUD, thus aiding the pilots with navigating the aircraft and significantly reducing the risk of accidents (especially during inclement weather conditions).

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An aircraft display control system, comprising:
one or more displays configured to present a video stream of a surrounding environment to a user of the aircraft;
one or more image sensors configured to generate images of the surrounding environment; and
a controller communicatively coupled to the one or more image sensors and the one or more displays, wherein the controller includes one or more processors configured to execute program instructions, wherein the program instructions include:
a brightness equalization module, wherein the brightness equalization module causes the one or more processors to:
measure an apparent brightness of a first frame of the video stream of the surrounding environment, wherein the apparent brightness is defined by (i) an average of grayscale levels of pixels of the first frame and (ii) a standard deviation of the grayscale levels of the pixels of the first frame,
apply a sigmoid transform function to equalize grayscale levels of pixels of a second frame of the video stream based on the apparent brightness of the first frame of the video stream, and
display the second frame at the equalized grayscale levels on the one or more displays to the user of the aircraft.

2. The system of claim 1, wherein the first frame and the second frame are a single frame of the video stream.

3. The system of claim 1, wherein the first frame and the second frame are different frames of the video stream.

4. The system of claim 1, wherein applying the sigmoid transform function further comprises:
adjusting a center of the sigmoid transform function to equalize the grayscale levels of the pixels of the second frame based on the apparent brightness of the first frame.

5. The system of claim 1, wherein the program instructions include an enhanced vision system (EVS) module, wherein the EVS module causes the one or more processors to:
generate enhanced images of the surrounding environment by overlaying flight data on the images of the surrounding environment, and
display the video stream including the enhanced images on the one or more displays to the user of the aircraft.

6. The system of claim 5, wherein the flight data overlaid on the enhanced images includes at least one of air speed data, altitude data, horizon orientation data, navigation data, terrain data or obstacle data.

7. The system of claim 5, wherein the program instructions include a synthetic vision system (SVS) module, wherein the SVS module causes the one or more processors to:
generate synthetic images of the surrounding environment, and
display the video stream including the synthetic images on the one or more displays to the user of the aircraft.

8. The system of claim 7, wherein the synthetic images are generated based on a database including at least one of terrain data or obstacle data.

9. The system of claim 7, wherein the program instructions include a combined vision system (CVS) module, wherein the CVS module causes the one or more processors to:
generate combined images of the surrounding environment by overlaying the enhanced images and the synthetic images, and
display a combined video stream including the combined images on the display(s) to the user of the aircraft.

10. The system of claim 1, wherein the one or more displays include at least one of a heads-up-display (HUD), a primary flight display (PFD), or a multi-function display (MFD).

11. The system of claim 1, wherein the one or more displays are communicatively coupled to an application-specific integrated circuit (ASIC) or a field-programmable gate array (FPGA).

12. The system of claim 1, wherein the one or more image sensors comprise at least one of an electro-optical sensor or an infrared sensor.

13. The system of claim 1, wherein the display(s) include at least one of a cathode-ray tube (CRT), liquid-crystal display (LCD), light-emitting diode (LED), organic light-emitting diode (OLED), or transparent or partially transparent OLED.

* * * * *